W. B. McCANN.
ICE CREAM FREEZER.
APPLICATION FILED MAY 5, 1908.
967,221.
Patented Aug. 16, 1910.
2 SHEETS—SHEET 1.
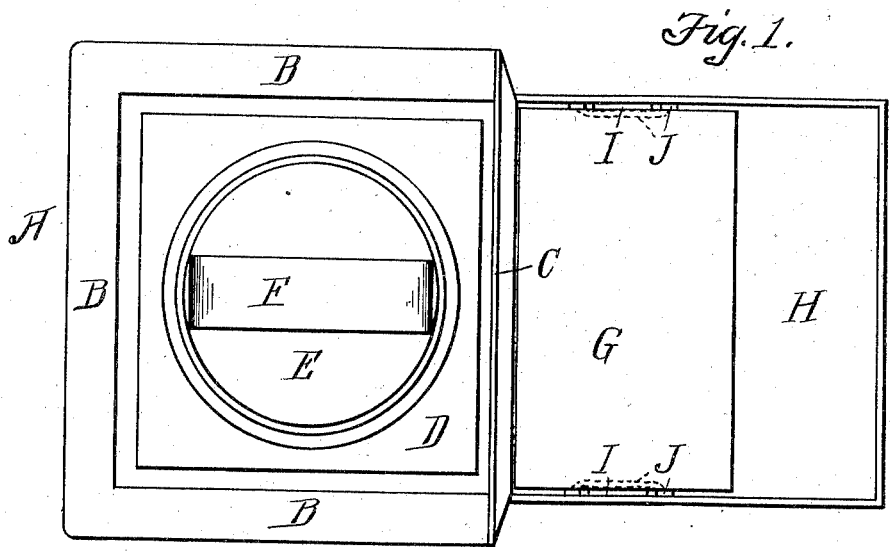
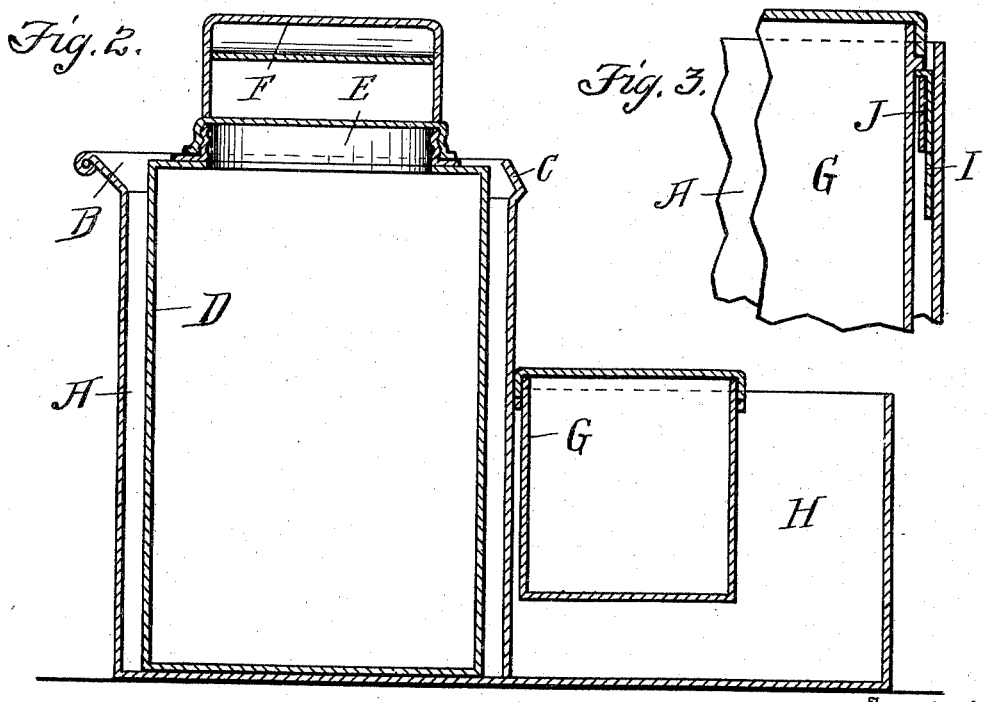

W. B. McCANN.
ICE CREAM FREEZER.
APPLICATION FILED MAY 5, 1908.
967,221.
Patented Aug. 16, 1910.
2 SHEETS—SHEET 2.
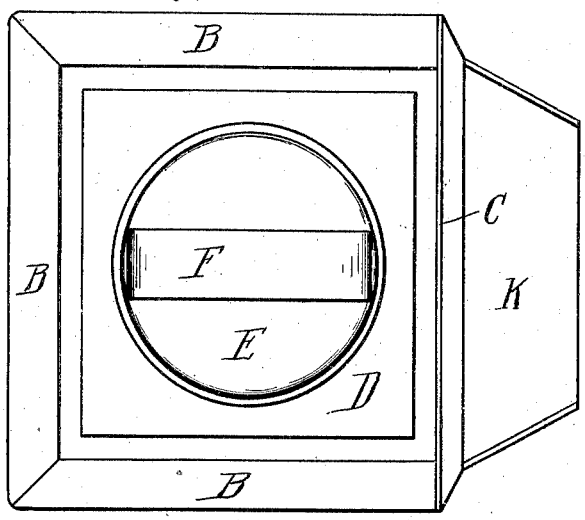
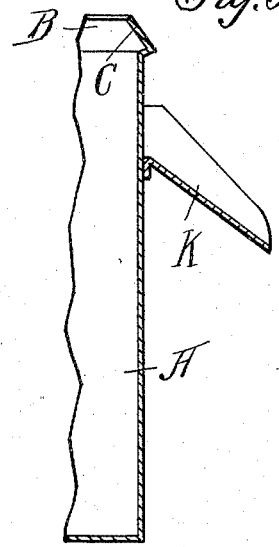
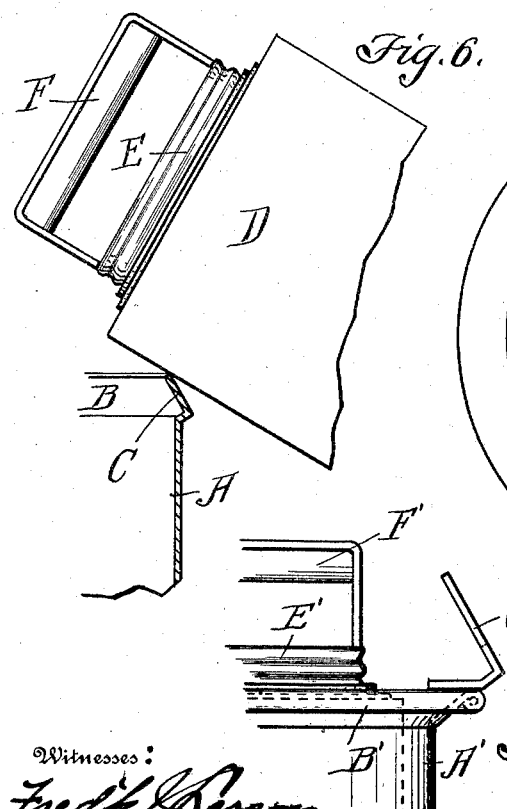
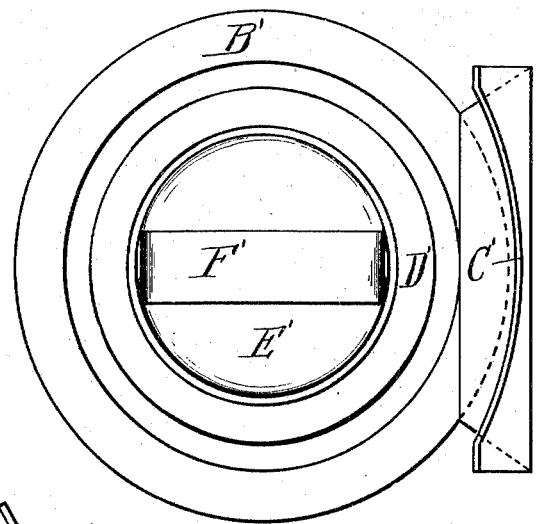
Inventor:
William Benton McCann
Witnesses:

UNITED STATES PATENT OFFICE.

WILLIAM BENTON McCANN, OF OMAHA, NEBRASKA, ASSIGNOR, BY MESNE ASSIGNMENTS, TO MARVEL MANUFACTURING COMPANY, A CORPORATION OF NEBRASKA.

ICE-CREAM FREEZER.

967,221. Specification of Letters Patent. Patented Aug. 16, 1910.

Application filed May 5, 1908. Serial No. 431,068.

*To all whom it may concern:*

Be it known that I, WILLIAM BENTON MCCANN, a citizen of the United States, residing at Omaha, in the county of Douglas and State of Nebraska, have invented a new and useful Improvement in Ice-Cream Freezers, of which the following is a specification.

My invention relates to improvements in ice cream freezers, and the object is to produce a simple and effective machine to do its work rapidly and with very little labor and expense.

I am familiar with the many different styles of ice cream freezers which have been invented and patented within the last few years, such as the rotary revolving cylinder, using journal bearings, castings and wood boxes or casings and other freezers using wooden tubs or buckets, tin can with dasher, castings and gearings, and my object is to provide a freezing device to be manufactured out of tin plate only, using no castings or wood.

My invention has for its object certain improvements in ice cream freezers which consist of a round or square tin receptacle, with an opening at the top having a tin screw cap, provided with a handle; the receptacle being for the refrigerating mixture, as ice and salt. The refrigerating receptacle is surrounded by an outer tin casing, having a rim or hopper around the top, to prevent the liquids from overflowing and having a liquid space between the refrigerating receptacle and casing; this space being adapted for receiving the mixtures to be frozen. The mixtures to be frozen can be put in the casing before the refrigerating receptacle, or the refrigerating receptacle can be set in the casing, and the mixture to be frozen can then be poured into the casing about the refrigerating receptacle. The cream will freeze at once on the outside of the refrigerating receptacle. To remove the frozen cream or other mixture, I use one side of the top of the rim of the casing for a scraper, by bending a shoulder to make it rigid. By lifting the refrigerating receptacle up until the bottom is level with the scraper, pressing the side of the receptacle against said scraper and lowering the receptacle while in engagement with the scraper, the frozen material on the side of the receptacle will be scraped off and fall outside the casing into a hereinafter described mold or other container. This scraping process is repeated with respect to each side of the receptacle, and until the supply of cream or mixture to be frozen is exhausted, and may be continued further by pouring a fresh supply of cream into the casing. The operation can thus be continued until the mold is filled, and several different kinds of flavors can be frozen by supplying a different flavor upon exhausting a supply in the receptacle. In practice, I find that the refrigerating receptacle takes up every particle of the cream or other mixture at the completion of a freezing operation, leaving nothing to be intermingled with the next supply.

The casing has a packing vessel and mold attached to the side having the scraper; and this vessel is packed with salt and ice around the mold to keep the frozen material after it is taken off the refrigerating receptacle.

In the accompanying drawing I have shown the preferred form of my invention.

Figure 1 is a top plan view of the rim or hopper, refrigerating receptacle, screw cap and handle, liquid space packing vessel and mold. Fig. 2 is a central vertical section of the freezer, showing the casing rim or hopper space for liquids, refrigerating receptacle receiving mold and packing vessel, scraper bent on the top of casing, forming part of the rim or hopper. Fig. 3 is a detail sectional view of the way the mold is attached to the packing vessel. Fig. 4 is a top plan view of the rim or hopper refrigerating receptacle casing liquid space and chute, with mold and packing vessel detached. Fig. 5 is a sectional view of the casing showing the bend on the top of casing to form the scraper, with the chute attached to the casing. Fig. 6 is a detail sectional view of the refrigerating receptacle casing and scraper partly broken away. Fig. 7 is a top plan view of a modified form of freezer, showing the rim or hopper, liquid space, round casing and refrigerating receptacle and scraper. Fig. 8 is a detail elevational view of how the scraper is attached to the top rim or hopper of a round casing broken away.

I do not confine myself to a square casing, as I can make a round casing which is just as simple as the square freezer. A suitable casing A is provided having a rim B, formed around the top of the casing A, and a scraper C bent with a shoulder on one side of the casing A. The scraper C serves as part of the rim B, to prevent the overflow of the liquid to be frozen. The refrigerating receptacle D which should be made of tin plate is formed with an opening in the top for enabling charging it with a refrigerating mixture, as ice and salt. This opening is closed by a removable tin screw cap E provided with a handle F, fixed to the top of the screw cap E. The refrigerating receptacle D is simply set into the casing A as shown in Figs. 1, 2, 4 and 7. The side of casing A having scraper C is for the mold G or receiver to set against for the frozen cream. This mold G is set down in the refrigerating vessel H for packing the refrigerating mixture around the mold G. The vessel H is attached to the casing A, the mold G is held in place by a piece of tin clip I soldered on each end at the top of mold G; the clip I is to slip under a loop J, soldered on the inside at the top of vessel H, as shown in Fig. 3.

In Figs. 4 and 5 I have illustrated the casing A without the vessel H, and mold G. It is intended to deposit the frozen cream in the chute K, to be received in any kind of vessel to be used at once.

In Figs. 7 and 8 is illustrated a modified embodiment comprising the round casing A' with rim or hopper B' with scraper C' soldered to the top of rim B'. Scraper C' is made by bending a piece of tin plate L shape and cutting a part circle out of the upper edge of the scraper C', to conform with the round refrigerating receptacle D'.

Fig. 8 shows how the scraper C' is attached to the rim B' of the round casing A', by soldering the scraper C' on the top of rim B'. The usual cap E' and handle F' is provided for receptacle D'.

To operate the freezer is simple. Charge the refrigerating receptacle D with the freezing mixture, then screw on the tin cap E, set the refrigerating receptacle D in the casing A, pour in the casing A cream, ice, ices or sherbets, to be frozen. The cream or ice, or ices instantly freeze in a film on the outside of the face of the refrigerating receptacle D. The thickness of the film depends on the time the refrigerating receptacle D is left standing in casing A. In one minute a nice heavy coating or film of smooth cream will be frozen on the face of refrigerating receptacle D, this film of cream to be removed by raising the refrigerating receptacle D out of the casing A, then holding the refrigerating receptacle D against the scraper C as it is let down in the casing A; when the refrigerating receptacle D is raised out of the casing A again, turned one-fourth way around to remove the film off the other side, as it is let down again in the casing A. This is repeated until all the cream is taken off the four sides of refrigerating receptacle D. After all the cream has been removed from the four sides of refrigerating receptacle D the refrigerating receptacle D is raised out of the casing A and the bottom of refrigerating receptacle D is drawn across the scraper C to remove the frozen cream. The vessel H is packed with ice and salt, around the mold G to keep the frozen material. The freezer is so small that it can be set in refrigerator or icebox after it has been charged and used to keep the refrigerating mixture for future use. The capacity of the freezer is unlimited. It can freeze one dish of cream or several dishes. Keep pouring in the liquid in the casing A and taking the frozen cream off the receptacle D as long as the refrigerating mixture lasts, and then recharge.

The scraping operation may of course be accomplished otherwise than by the vertical longitudinal movement of the receptacle D, as by lifting the receptacle bodily from casing A and inclining the receptacle as seen in Fig. 6, but the vertical reciprocation is preferred as being best adapted to coöperative action with the scraper, and also being more economical of time, labor and refrigerating elements than the second method.

It is to be noted that the scraper is provided with an outwardly and downwardly inclined surface which serves as a chute in lieu of chute K when the same is not employed, and thus delivers the frozen product to the mold.

Having thus described my invention, what I claim and desire to secure by Letters Patent, to-wit: is—

1. In an ice cream freezer, the combination with a refrigerant receptacle, of a casing surrounding the same, and a scraper carried by the upper edge of the casing and projecting inwardly from the wall of the casing and adapted to engage the side of the receptacle when the receptacle is moved vertically across the scraper.

2. In an ice cream freezer, the combination with a longitudinally movable refrigerant receptacle, of a casing surrounding the same and adapted to contain material to be frozen, and a scraper extending inwardly from the casing into position for engaging the side of the receptacle when the receptacle is moved longitudinally across the scraper.

3. In an ice cream freezer, the combination with a bodily movable refrigerant receptacle, of a casing surrounding the same, a container outside the casing, and a scraper adapted to engage the side of the receptacle when the receptacle is moved bodily across the scraper for scraping frozen substance therefrom, said scraper being inclined toward the container for directing the frozen substance toward the container.

4. In an ice cream freezer, the combination with a refrigerant receptacle, of a casing surrounding the same, a chute extending from the outside of said casing, and a scraper having an edge presented toward the side of the receptacle for scraping frozen substance therefrom when the receptacle is moved across the scraper, the scraper being inclined toward the chute for directing such frozen substance toward the chute.

5. In an ice cream freezer, the combination with a refrigerant receptacle, of a casing surrounding the same and having an outwardly turned flange at its upper end, a portion of the flange being formed into a scraper designed and adapted to remove frozen substance from the receptacle when the receptacle is moved across the scraper.

6. In an ice cream freezer, the combination with a refrigerant receptacle, of a casing surrounding the same and having an outwardly turned flange on its upper end, a portion of said flange having an inwardly turned shoulder forming a scraper designed and adapted to engage the side of the receptacle for removing frozen substance therefrom when the receptacle is moved across the scraper.

7. In an ice cream freezer, the combination of a casing, a refrigerant receptacle longitudinally movably mounted therein and a scraper arranged at the upper end of the casing and disposed contiguous to one side of the receptacle and designed and adapted to be engaged thereby when the receptacle is moved longitudinally across the scraper.

8. In an ice cream freezer, the combination of an inclosing casing having an open upper end, said casing being adapted to contain the material to be frozen, a refrigerant receptacle surrounded by said casing, and adapted to be moved longitudinally of the casing and introduced and removed through the open upper end thereof, and a scraper mounted on the casing at its upper end and projecting inwardly from the wall of the casing and adapted to scrape frozen material from the refrigerant receptacle when said receptacle is moved longitudinally across the scraper.

In witness whereof, I have hereunto signed my name in the presence of two subscribing witnesses.

WILLIAM BENTON McCANN.

Witnesses:
FREDK. J. LARSON,
HELEN V. REAP.